(12) United States Patent
Zimmerman

(10) Patent No.: US 9,433,138 B2
(45) Date of Patent: Sep. 6, 2016

(54) RETRACTABLE INDUCTOR

(71) Applicant: Advanced Ag Concepts Inc., Eureka, IL (US)

(72) Inventor: Benjamin G. Zimmerman, Eureka, IL (US)

(73) Assignee: Advanced Ag Concepts Inc., Eureka, IL (US)

( * ) Notice: Subject to any disclaimer, the term of this patent is extended or adjusted under 35 U.S.C. 154(b) by 90 days.

(21) Appl. No.: 14/184,495

(22) Filed: Feb. 19, 2014

(65) Prior Publication Data

US 2014/0230704 A1 Aug. 21, 2014

Related U.S. Application Data

(60) Provisional application No. 61/766,378, filed on Feb. 19, 2013.

(51) Int. Cl.
| | |
|---|---|
| *A01C 7/06* | (2006.01) |
| *A01C 7/20* | (2006.01) |
| *A01C 23/02* | (2006.01) |
| *A01C 5/06* | (2006.01) |
| *A01B 63/26* | (2006.01) |

(52) U.S. Cl.
CPC ............ *A01B 63/26* (2013.01); *A01C 7/06* (2013.01); *A01C 7/205* (2013.01); *A01C 23/024* (2013.01); *A01C 5/064* (2013.01)

(58) Field of Classification Search
CPC .......... A01C 7/06; A01C 7/00; A01C 7/205; A01C 7/201; A01C 7/20; A01C 23/024; A01C 23/023; A01C 23/02; A01C 23/00; A01C 5/064; A01C 5/062; A01C 5/06; A01C 5/00; A01B 63/26; A01B 63/24; A01B 63/14; A01B 63/00
See application file for complete search history.

(56) References Cited

U.S. PATENT DOCUMENTS

| | | |
|---|---|---|
| 3,292,562 A | 12/1966 | Clark |
| 3,319,589 A | 5/1967 | Moran |
| 3,799,079 A | 3/1974 | Dietrich |
| 4,466,364 A | 8/1984 | Hassenfritz |
| 4,538,532 A | 9/1985 | Coker |
| 4,564,075 A | 1/1986 | Chekouras |
| 4,656,957 A | 4/1987 | Williamson et al. |
| 4,745,978 A | 5/1988 | Williamson |
| 4,947,770 A | 8/1990 | Johnston |
| 5,027,724 A | 7/1991 | Ptacek et al. |
| 5,129,282 A | 7/1992 | Bassett et al. |
| 5,341,754 A | 8/1994 | Winterton |
| 5,461,995 A | 10/1995 | Winterton |
| 5,462,124 A | 10/1995 | Rawson |
| 5,467,723 A | 11/1995 | McIvor-Dean et al. |
| 5,520,125 A | 5/1996 | Thompson et al. |
| 5,531,171 A | 7/1996 | Whitesel et al. |
| 5,574,657 A | 11/1996 | Tofte et al. |

(Continued)

FOREIGN PATENT DOCUMENTS

EP 2227930 A1 9/2010

*Primary Examiner* — Christopher J Novosad

(74) *Attorney, Agent, or Firm* — Thomas J. Oppold; Larkin Hoffman Daly & Lindgren, Ltd.

(57) ABSTRACT

An inductor mountable to a frame member of an implement. The inductor is movable between a working position and a stowed position. In the working position, the soil engaging tool is in engagement with the soil. In the stowed position, the soil engaging tool is out of engagement with the soil.

13 Claims, 9 Drawing Sheets

Working Position      Stowed Position

(56) References Cited

U.S. PATENT DOCUMENTS

| | | |
|---|---|---|
| 5,622,124 A | 4/1997 | Smith et al. |
| 5,704,430 A | 1/1998 | Smith et al. |
| 5,862,763 A | 1/1999 | Dietrich, Sr. |
| 5,878,678 A | 3/1999 | Stephens et al. |
| 5,970,892 A | 10/1999 | Wendling et al. |
| 6,006,684 A * | 12/1999 | Whalen ............ A01C 15/00 111/121 |
| 6,135,037 A | 10/2000 | Juptner |
| 6,223,663 B1 | 5/2001 | Wendling et al. |
| 6,253,692 B1 | 7/2001 | Wendling et al. |
| 6,701,856 B1 | 3/2004 | Zoske et al. |
| 7,213,523 B2 | 5/2007 | Neudorf et al. |
| 7,222,575 B2 | 5/2007 | Bassett |
| 7,395,770 B2 | 7/2008 | Neudorf et al. |
| 7,451,711 B1 | 11/2008 | Wollmann |
| 7,581,503 B2 | 9/2009 | Martin et al. |
| 7,673,570 B1 | 3/2010 | Bassett |
| 2010/0101466 A1 | 4/2010 | Riewerts et al. |

\* cited by examiner

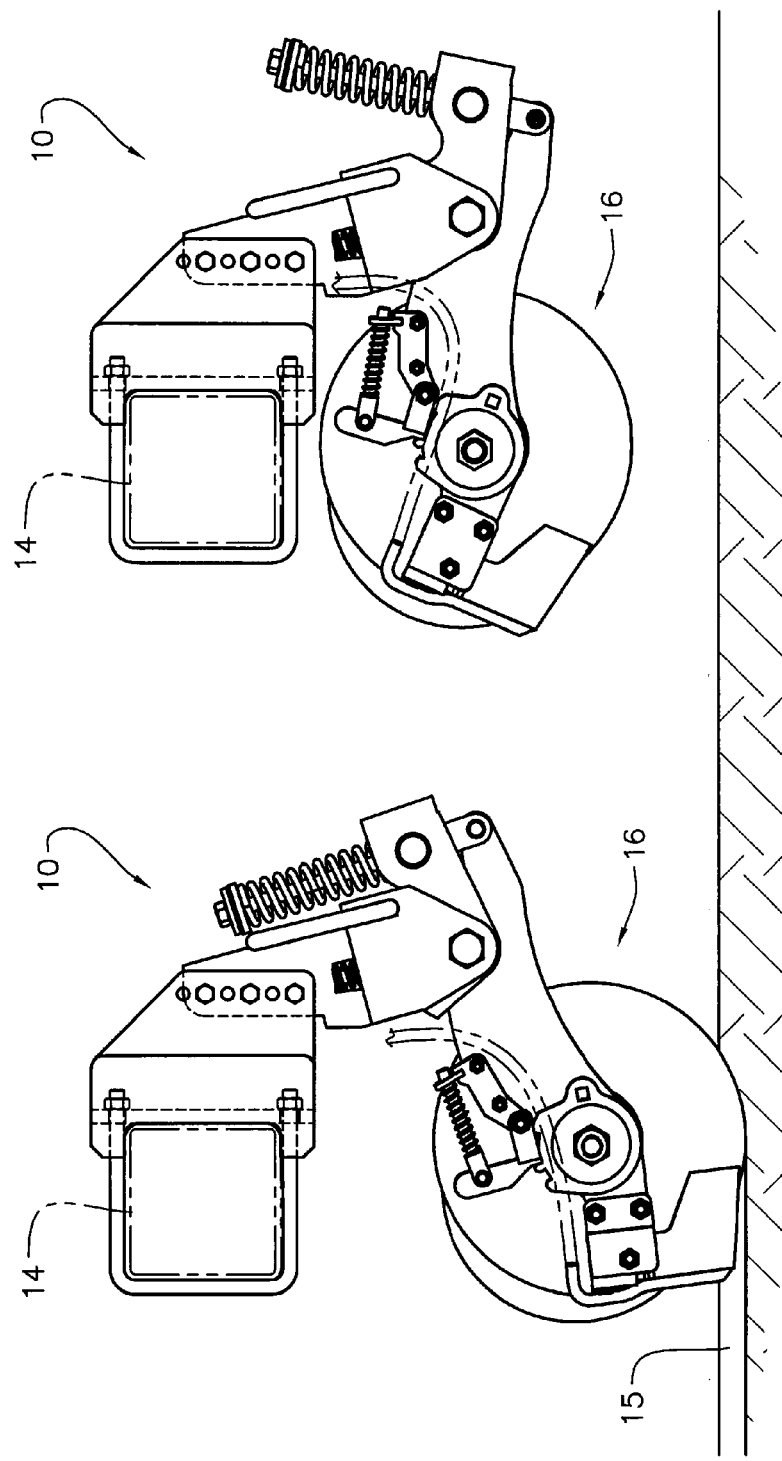

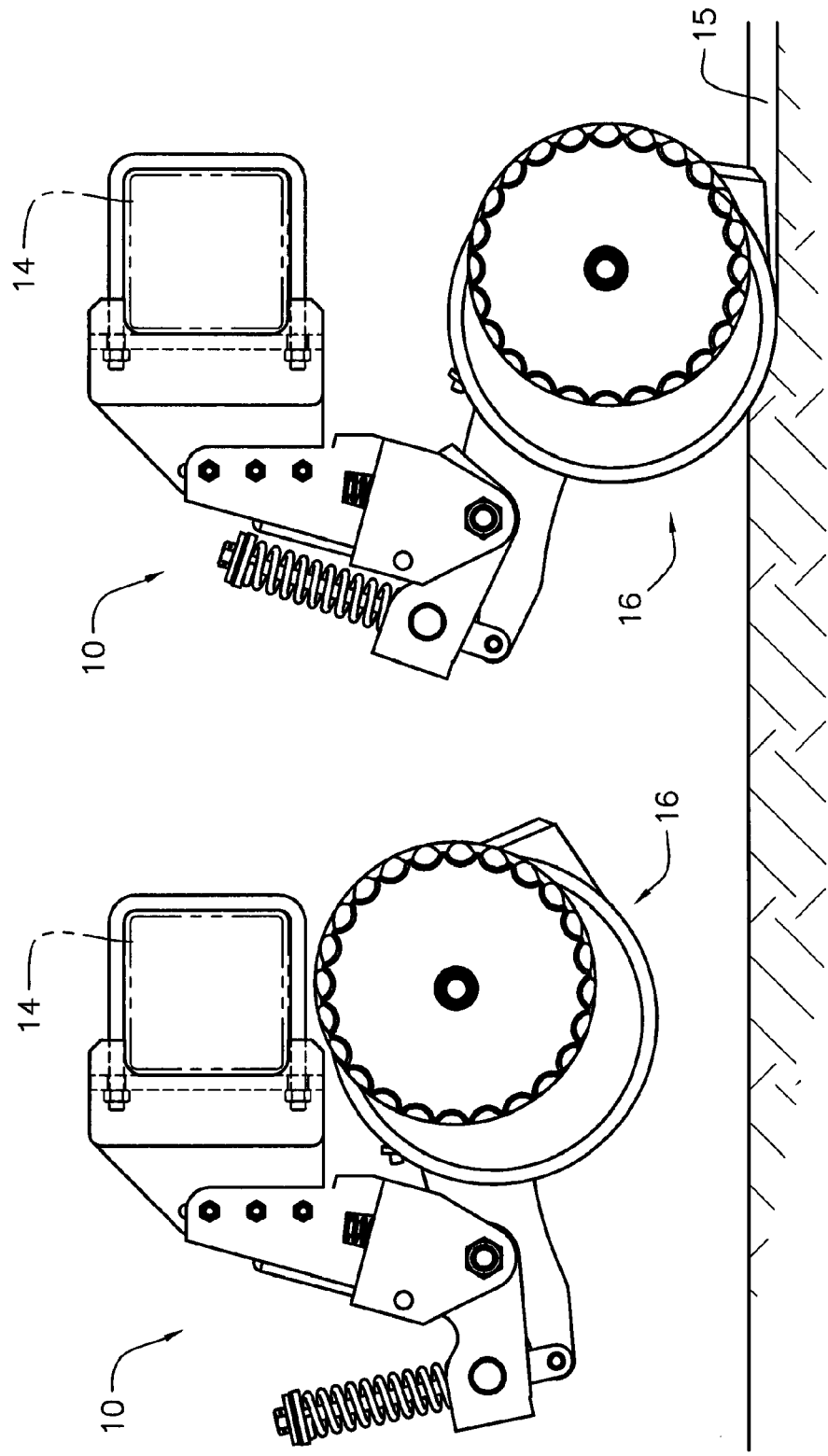

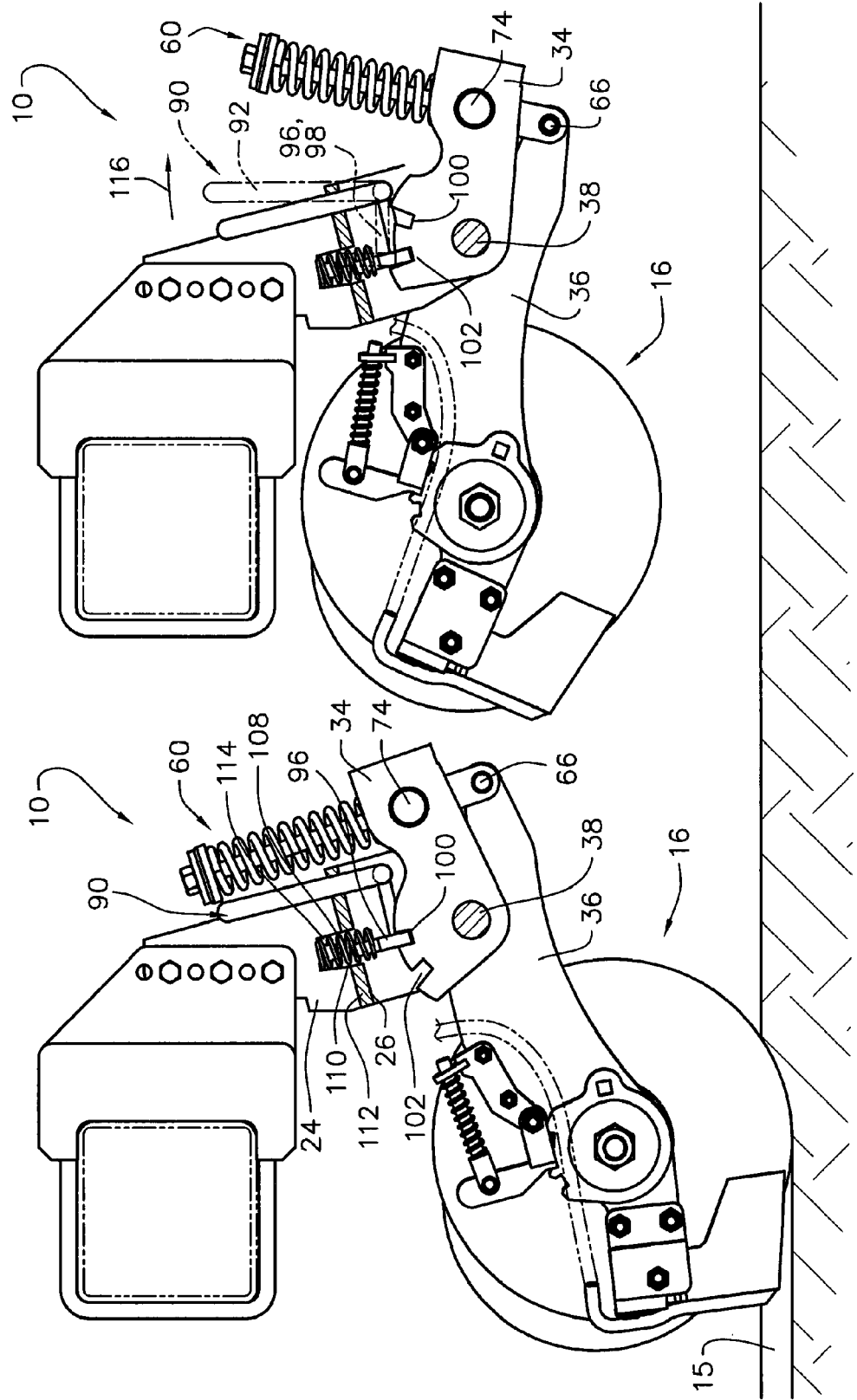
FIG. 8 Working Position
FIG. 9 Stowed Position

RETRACTABLE INDUCTOR

CROSS-REFERENCE TO RELATED APPLICATIONS

This application claims priority to U.S. Provisional Patent Application No. 61/766,378 filed Feb. 19, 2013.

BACKGROUND

There are various arrangements for mounting inductors to the frame of an implement for purposes of cutting trenches in the soil for the application of anhydrous ammonia, fertilizers or other soil treatments. However, most mounting arrangements do not permit the inductors to be retracted for stowing the inductors out of soil engagement when use of the inductors is not desired. In the few instances where mounting arrangements permit the inductors to be retracted for stowing, it is necessary to use tools to loosen and retighten bolts and brackets in order to raise and lower the inductors between a working position and a stowed position, which is time consuming and cumbersome. There are some inductors that are hydraulically or pneumatically actuated to raise and lower the inductors automatically between a working position and a stowed position, but such automatic systems are costly. Accordingly, there is a need for a manually retractable inductor that is relatively low cost, but permits the inductors to be easily retractable from a working position to a stowed position.

DESCRIPTION OF THE DRAWINGS

FIGS. 2 and 3 are right side elevation views of the inductor of FIG. 1 showing the inductor movable between the working position and stowed position, respectively.

FIGS. 4 and 5 are left side elevation views of the inductor of FIG. 1 showing the inductor movable between the stowed position and working position, respectively.

FIGS. 8 and 9 are partial cut-away views of FIGS. 2 and 3, respectively, showing movement of the stow lever with respect to the stow bracket.

DESCRIPTION

Figure 1:
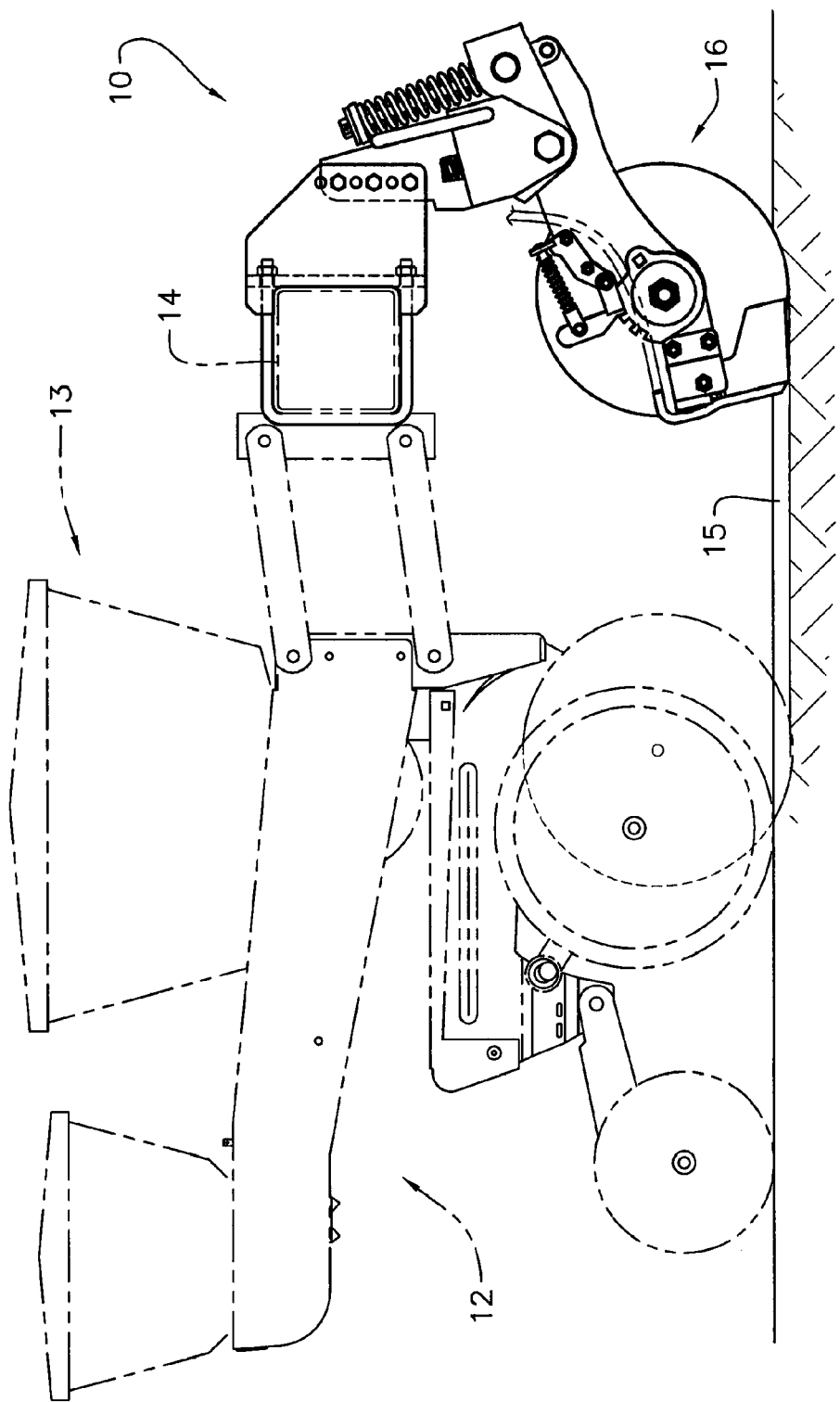
FIG. 1 is a right side elevation view of a planter row unit with an embodiment of a retractable single disk fertilizer inductor mounted thereto.

Referring to the drawings wherein like reference numerals designate the same or corresponding parts throughout the several views, FIG. 1 is a side elevation view of an embodiment of a retractable single disk fertilizer inductor 10 mounted in alignment with a row unit 12 of a conventional planter 13. Although only one inductor 10 and one row unit 12 is shown in FIG. 1, it should be understood that a planter 13 includes a plurality of row units 12 laterally spaced across the length of frame member or toolbar 14 to which a corresponding inductor 10 is aligned.

As shown in FIGS. 2 and 3, and as described in more detail later, the inductor 10 is movable between a working position and a stowed position. In the working position, the inductor 10 includes a soil engaging tool 16 such as a coulter or a shank which cuts a trench 15 into the soil into which anhydrous ammonia, fertilizer or other soil treatment is deposited via a conduit 150 (discussed later). If the operator is not applying the soil treatment, the inductor 10 may be raised to the stowed position such that the soil engaging tool 16 and conduit 150 are out of engagement with the soil.

Figure 6:
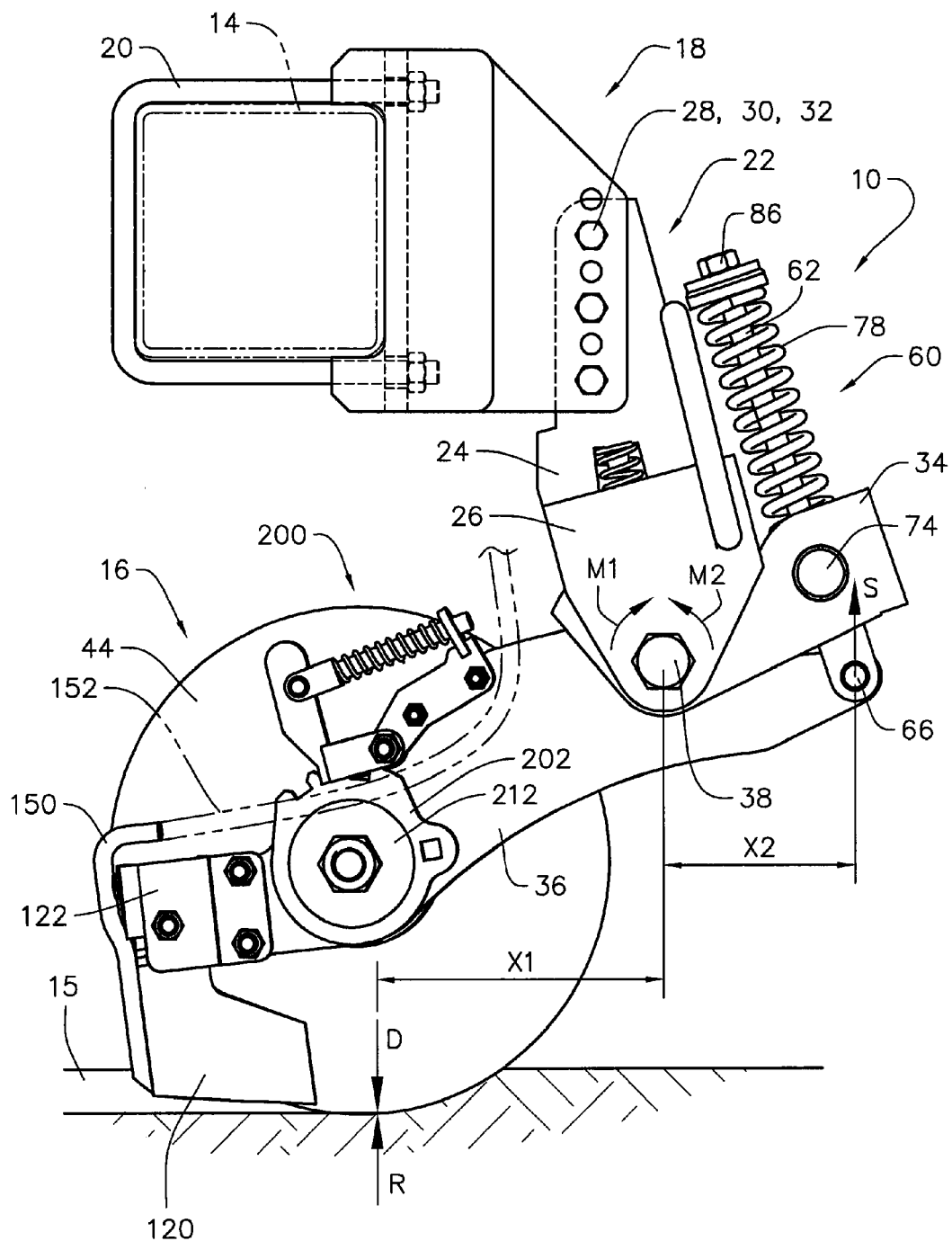
FIG. 6 is an enlarged view of FIG. 1 showing the inductor in the working position.
Figure 7:
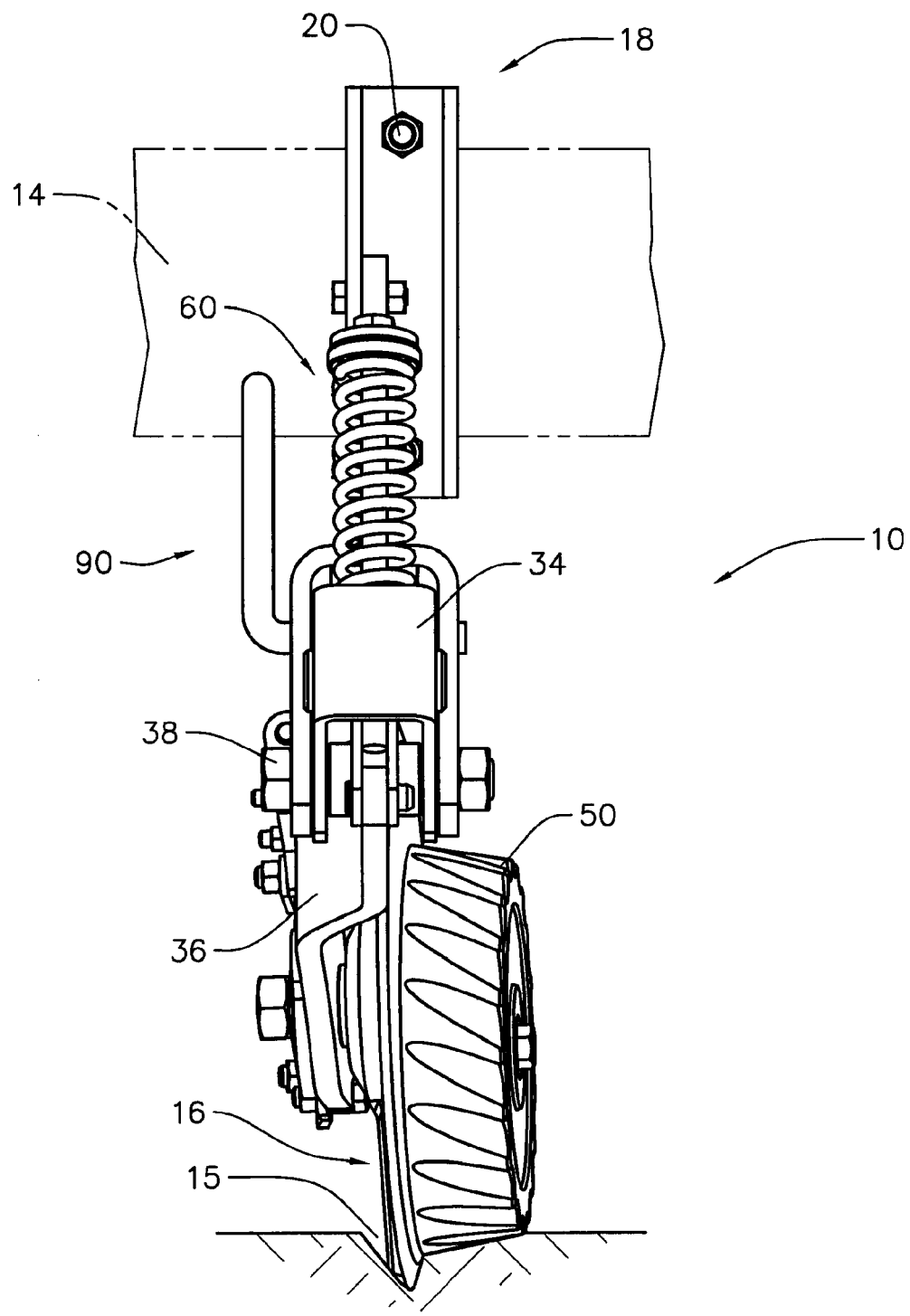
FIG. 7 is an enlarged front elevation view of the inductor of FIG. 1 in the working position.
Figure 10:
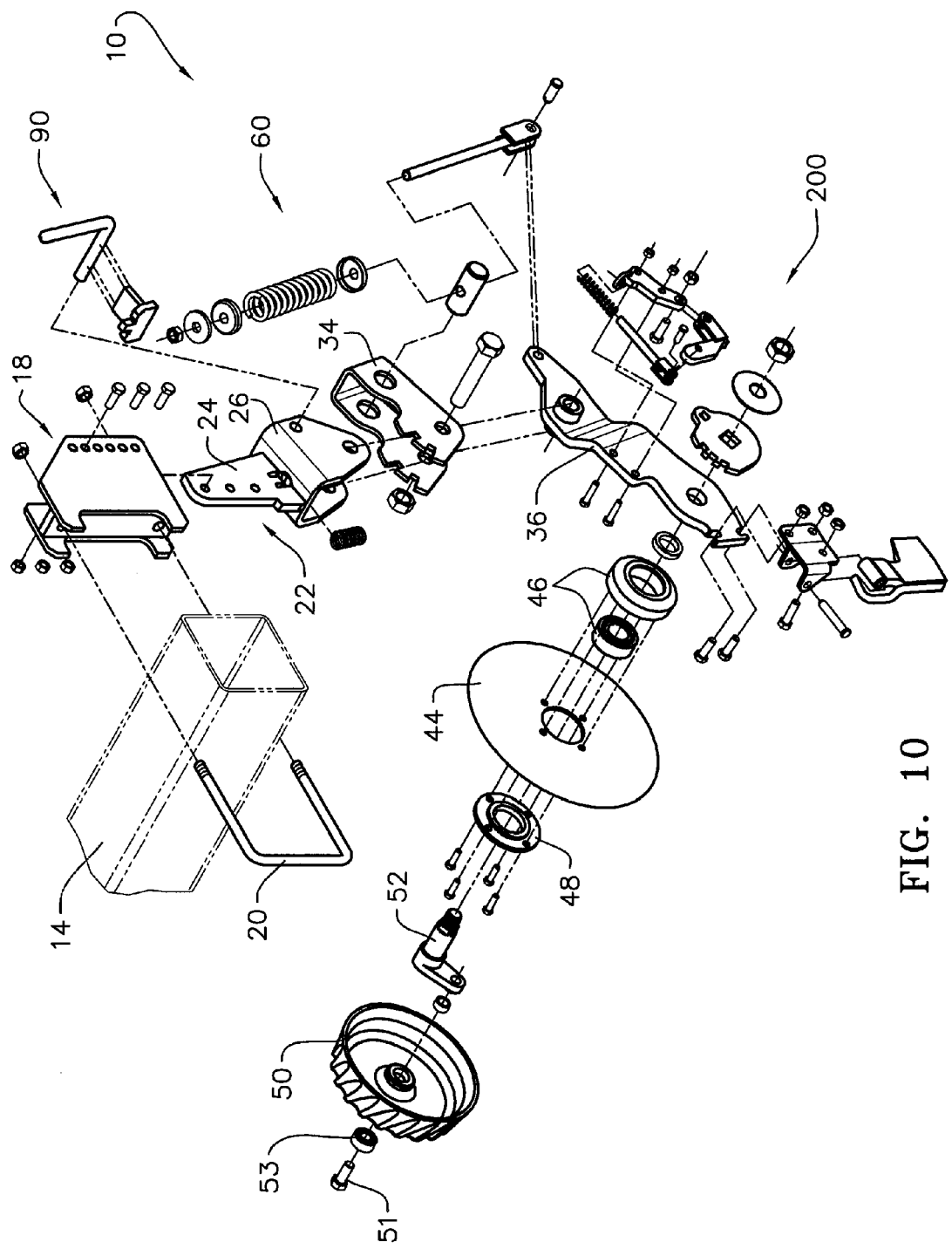
FIG. 10 is an exploded rear perspective view of the inductor of FIG. 1.
Figure 11:
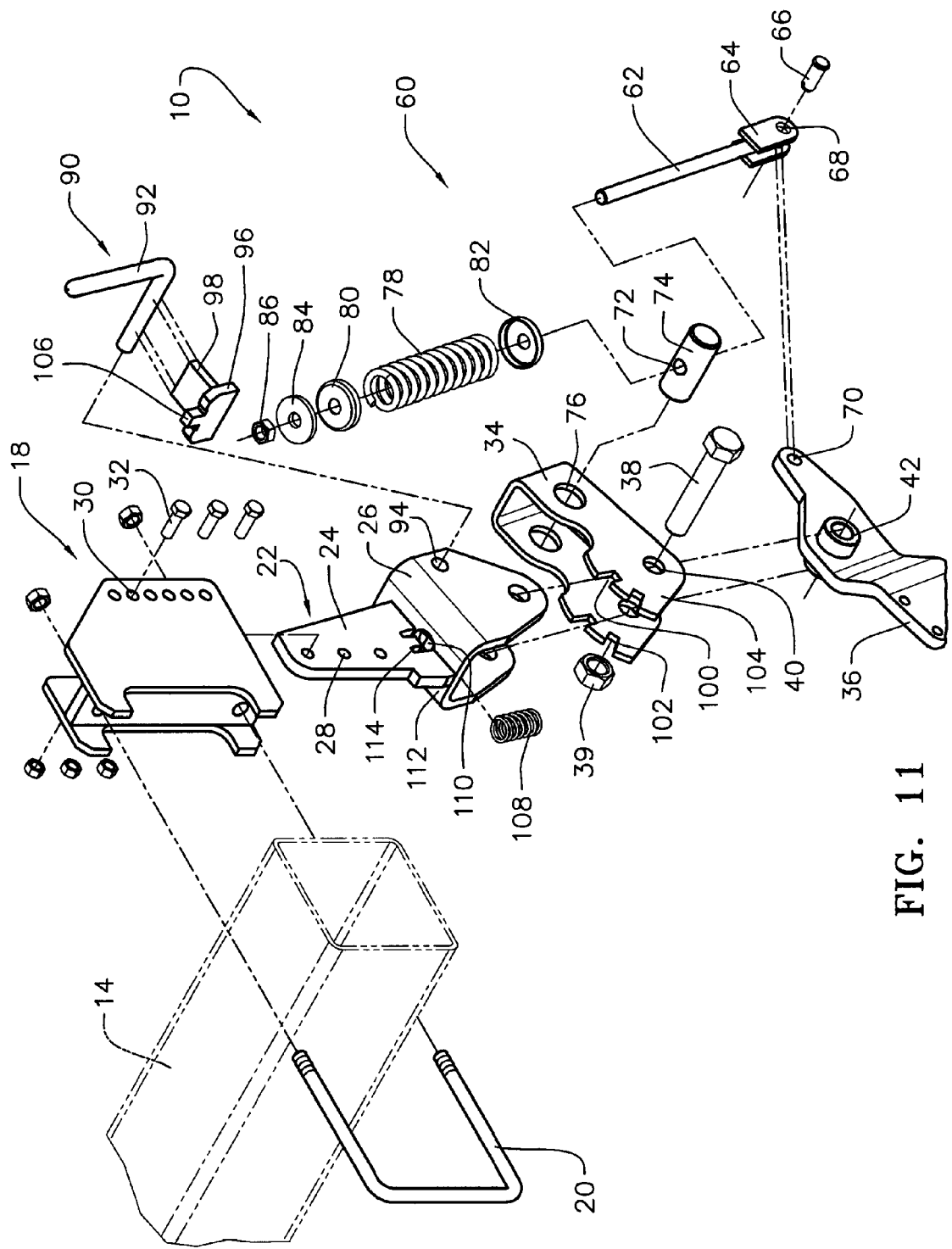
FIG. 11 is an enlarged perspective view of a portion of FIG. 10.

As best viewed in FIG. 6 and the exploded view of FIGS. 10 and 11 (wherein FIG. 11 is an enlarged view of a portion of the exploded perspective view of FIG. 10), the inductor 10 may be mounted to the frame member 14 of a planter or a tillage implement by a frame mount 18 secured by a U-bolt connection 20 or other suitable mounting means. The frame mount 18 adjustably supports a saddle assembly 22 comprising a vertical plate 24 and a saddle bracket 26. The vertical plate 24 includes apertures 28 which align with apertures 30 in the frame mount 18 for adjustable attachment by nut and bolt connectors 32.

The saddle bracket 26 receives a stow bracket 34 which pivotally supports a rocker arm 36 via a pivot bolt 38 extending through apertures 40 in the stow bracket 34 and through a bushing 42 in the rocker arm 36. The pivot bolt 38 is secured by a nut 39.

A distal end of the rocker arm 36 rotatably supports the soil engaging tool 16. In the embodiment illustrated, the soil working tool 16 comprises a coulter 44, but the soil engaging tool 16 could comprise a shank or knife or other soil engaging tool. In the embodiment illustrated, the coulter is mounted to the rocker arm 36 by a bearing assembly 46 and pressure plate 48. A gauge wheel 50 is also rotatably supported from the distal end of the rocker arm 36 by a dogleg spindle 52 which offsets the central axis of the gauge wheel 50 from the central axis of the coulter 44. A gauge wheel bolt 51 extends through the gauge wheel 50 and through a gauge wheel bearing 53 before being threadably received into the dogleg spindle 52 rotatably securing the gauge wheel 50 to the dogleg spindle 52.

A pressure spring assembly 60 is provided at the proximal end of the rocker arm 36 to provide supplemental downforce as explained later. The pressure spring assembly 60 includes a spring bolt 62 having a clevis 64 at its bottom end which receives the proximal end of the rocker arm. A clevis pin 66 received through apertures 68, 70 in the clevis 64 and rocker arm 36, respectively, pivotally secures the spring bolt 62 to the rocker arm 36. The spring bolt 62 is received through an aperture 72 in a swivel bolt 74 received through apertures 76 in the stow bracket 34. The spring bolt 62 extends through the longitudinal axis of a coil spring 78 and central apertures of upper and lower end caps 80, 82. The end of the spring bolt 62 extends through a top washer 84 and is threadably received by a top nut 86.

To ensure a substantially constant depth of the trench 15 despite encountering varying soil conditions, the desired amount of supplemental downforce may be set by tightening or loosening the top nut 86 on the spring bolt 62 to either further compress the coil spring 78 or to relieve compression on the coil spring 78 depending on soil conditions. Referring to FIG. 6, it should be appreciated that when the rocker arm 36 is locked into the working position by the stow lever 90 (discussed later) the vertical position of the coulter 44 with respect to the frame 14 of the implement 13 is relatively vertically set. Thus, as the frame 14 of the implement 13 to which the inductor 10 is attached, is lowered toward the soil, the coulter 44 will penetrate the soil exerting a vertical downforce represented by arrow D. The vertical downforce D is resisted by the reactionary force of the soil represented by arrow R (note, there is no reactionary force exerted by the soil on the gauge wheel 50 until the coulter 44 enters the soil to the depth corresponding to the offset distance between the gauge wheel 50 and coulter 44 as set by the depth adjuster assembly 200 (discussed later).

If the soil is hard due to compaction or other conditions, the resistance R of the soil may be sufficient to overcome the downforce D, thereby preventing the coulter 44 from fully penetrating the soil to the desired depth. If the resistance R overcomes the downforce D, the coulter 44 will raise out of the soil as the rocker arm 36 is forced to rotate in the clockwise direction (as viewed in FIG. 6) about the pivot bolt 38 due to the moment M1 produced by the resistance R multiplied by the offset distance X1 between the axis of the pivot bolt 38 and the centerline of the coulter 44 where the resistance R acts. To resist the rotation of the rocker arm 36 when the coulter 44 encounters hard soil, the compression force on the coil spring 78 is increased by tightening the top nut 86 onto the spring bolt. It should be appreciated that when the coil spring 78 is compressed, it will exert an axial force in the direction opposite the axial compression force with a magnitude proportional to the decrease in its axial length. At the bottom of the coil spring 78, this axial force is resisted by the vertically and horizontally fixed position of the swivel bolt 74 within the stow bracket 34. The axial force at the top of the spring 78, is resisted by the tension on the spring bolt 62 connected to the proximal end of the rocker arm 36 by clevis pin 66. Accordingly, it should be appreciated that by tightening the top nut 86, a vertically upward spring force represented by arrow S will pull upwardly on the proximal end of the rocker arm 36. This upforce S multiplied by the offset distance X2 from the axis of the clevis pin 66 to the axis of the pivot bolt 38 produces a moment M2 (for purposes of this description any horizontal force exerted by compressing the coil spring 78 and any resulting moment is disregarded). Thus, it should be appreciated that the more the top nut 86 is tightened onto the spring bolt 62, the greater the upforce S and the greater the moment M2 to overcome the resistance R of the soil thereby allowing the coulter 44 to fully penetrate the soil to the desired depth. Similarly, it should also be appreciated that if the coulter 44 encounters a rock or other obstruction, the arm 36 will pivot upwardly allowing the coulter 44 to ride up and over the obstruction to avoid damage to the inductor 10, but as the arm 36 pivots about the pivot bolt 38, the spring 78 will be forced to compress, producing a greater upforce S and greater moment M2. As the coulter 44 passes over the obstruction, the greater moment M2 will force the rocker arm 36 to spring back, returning the coulter 44 to the predefined depth as set by the gauge wheel depth adjustor 200 (discussed later).

The operation of moving the inductor 10 between the working position and the stowed position is best understood with reference to FIGS. 8, 9 and 11. In FIGS. 8 and 9, a portion of the saddle bracket 26 is cut away to illustrate the movement of the stow lever 90. The stow lever 90 comprises an L-shaped rod 92 which extends through apertures 94 in the saddle bracket 26. A notch plate 96 is fixed to a spacer plate 98 which is fixed to the L-shaped rod 92 between the walls of the saddle bracket 26. The notch plate 96 is wider than the spacer plate 98 and extends between notches 100, 102 in the spaced sidewalls 104 of the stow bracket 34. The top edge of the notch plate 96 includes a projection 106 which is received by the saddle spring 108. The saddle spring 108 extends through an aperture 110 in the top wall 112 of the saddle bracket 26. The top of the saddle spring 108 projects through the aperture 110 and is retained by slots 114 in the vertical plate 24 of the saddle assembly 22. The saddle spring 108 serves to bias the notch plate 96 within the notches 100, 102.

To move the inductor 10 from the working position (FIG. 8), the stow position (FIG. 9), the stow lever 90 is pulled forwardly as indicated by arrow 116 in FIG. 9, thus raising the notch plate 96 out of engagement with the forward notch 100 and compressing the saddle spring 108. With the notch plate 96 disengaged from the forward notch 100, the rocker arm 36 is free to pivot upwardly about the pivot bolt 38. Releasing the stow lever 90 allows the notch plate 96 to engage the rearward notch 102 locking the inductor 10 in the stowed position. To return the inductor 10 to the working position, the stow lever 90 is again pulled forwardly thus raising the notch plate 96 out of engagement with the rearward notch 102 and compressing the saddle spring 108. With the notch plate 96 disengaged from the rearward notch 102, the rocker arm 36 is free to pivot downwardly about the pivot bolt 38. Releasing the stow lever 90 allows the notch plate 96 to engage the forward notch 100 locking the inductor 10 in the working position.

Figure 12:
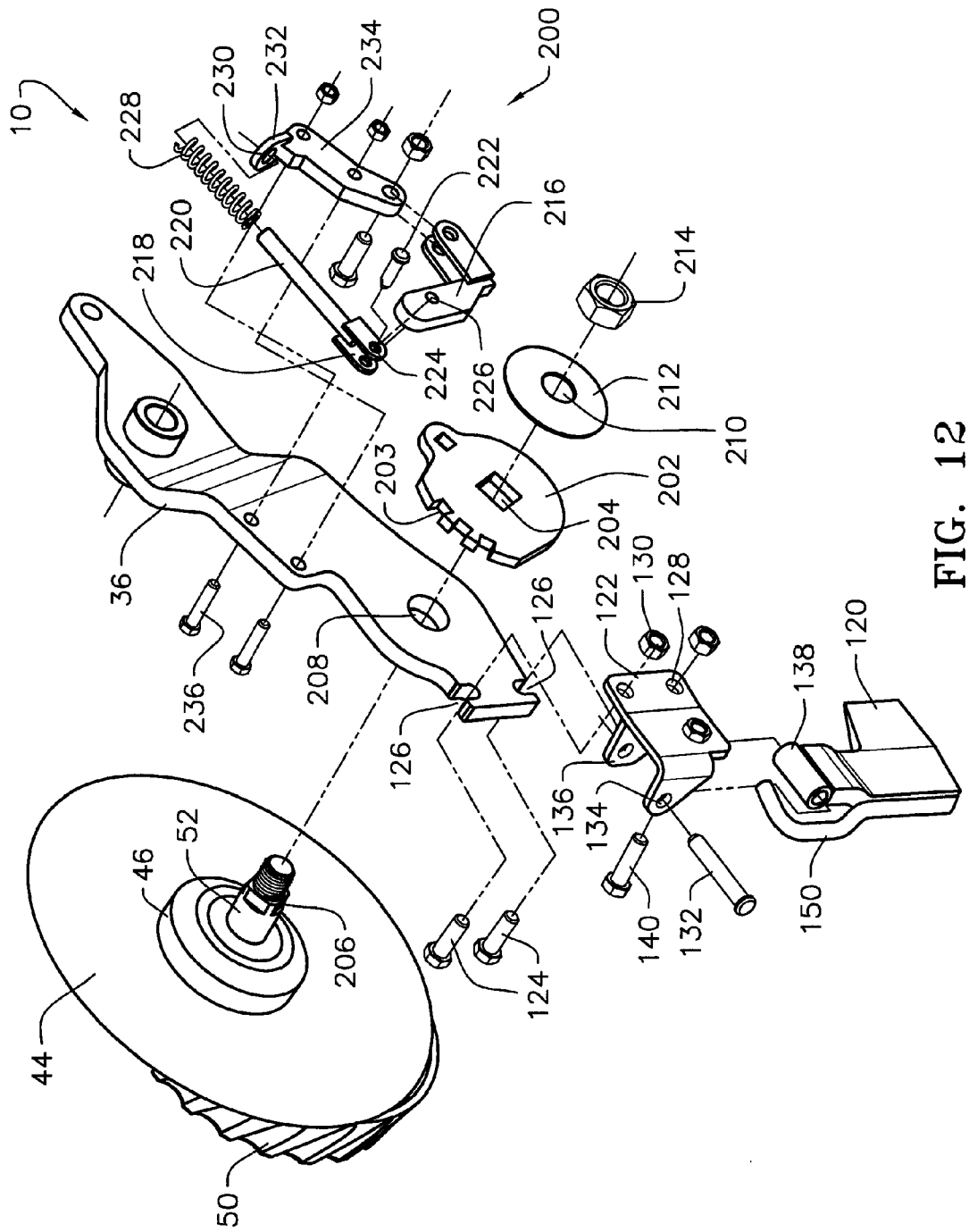
FIG. 12 is an enlarged perspective view of another portion of FIG. 10, but with some components assembled.

Referring to FIG. 12 (which is an enlarged view of a portion of the exploded perspective view of FIG. 10, with some of the components shown assembled), the distal end of the rocker arm 36 also supports a scraper 120 for scraping soil buildup from the coulter 44 during use. The scraper 120 is secured to the rocker arm 36 by a scraper bracket 122 which is retained on the rocker arm 36 by a pair of bolts 124 extending through recesses 126 in the distal end of the rocker arm 36 and through apertures 128 in the scraper bracket 122 and secured by nuts 130. The scraper 120 is pivotally mounted to the scraper bracket 122 by a pin 132 which is received through apertures 134 in ears 136 of the scraper bracket 122 and through a bushing 138 on the scraper 120. The scraper 120 is adjustable relative to the coulter 44 by a scraper adjusting bolt 140 which is threadably adjustable relative to the scraper bracket 122.

The scraper 120 supports a liquid injector conduit 150 adapted to receive an end of a liquid fertilizer tube 152 which is in fluid communication with liquid fertilizer reservoir (not shown). The liquid injector conduit 150 is disposed to direct the liquid fertilizer from the liquid fertilizer reservoir into the trench 15 formed in the soil as the coulter 44 rotates through the soil as the planter or other implement is pulled through the field.

The depth adjuster assembly 200 is best viewed and understood in connection with FIGS. 10 and 12. The depth adjuster assembly 200 includes an adjuster plate 202 having spaced slots 203 in an upper edge. The adjuster plate 202 includes a central square aperture 204 that is received over a mating square end fitting 206 of the dogleg spindle 52 which extends through aperture 208 in the rocker arm 36. The threaded end of the dogleg spindle 52 projects past the square aperture 204 in the adjuster plate 202 and through a central aperture 210 in a disk spring 212. A spindle nut 214 is threaded onto the threaded end of the dogleg spindle 52 which compresses the disk spring 212. Thus, the dogleg spindle 52 is secured to the rocker arm 36 and the adjuster plate 202 and the dogleg spindle 52 will rotate as a unit due to the square aperture 204 mating with the square fitting on the dogleg spindle 52.

A latch plate 216 is selectively received in the spaced slots to effect rotation of the dogleg spindle 52 and thus the relative position of the gauge wheel 50 with respect to the coulter 44. The latch plate 216 is secured to a clevis end 218 of a latch rod 220 by a latch pin 222 extending through mating apertures 224, 226 in the latch plate 216 and clevis end 218. The distal end of the latch rod 220 extends through a latch spring 228 and through an aperture 230 in the latch rod guide 232 fixed to the distal end of a latch bracket 234. The latch plate 216 is pivotally secured to the proximal end of the latch bracket 234 by a bolted connection. The latch bracket 234 is in turn rigidly attached to the rocker arm 36 by latch bracket mounting bolts 236.

To adjust the gauge wheel 50 with respect to the coulter 44, the latch plate 216 is selectively positioned into one of the desired slots 203 in the adjuster plate 202. The latch spring 228 received over the latch rod 220 biases the latch plate 216 within the selected slot 203. Additionally, the latch spring 228 provides bias against pivoting movement of the dogleg spindle 52 with respect to the coulter 44.

The foregoing description is presented to enable one of ordinary skill in the art to make and use the invention and is provided in the context of a patent application and its requirements. Various modifications to the preferred embodiment of the system, and the general principles and features of the system and methods described herein will be readily apparent to those of skill in the art. Thus, the present invention is not to be limited to the embodiments of the system and methods described above and illustrated in the drawing figures, but is to be accorded the widest scope consistent with the spirit and scope of the appended claims.

The invention claimed is:

1. A retractable inductor mountable to a frame of a planter, the frame supporting a plurality of row units movable with respect to the frame to a lowered planting position for depositing seeds into the soil, the retractable inductor comprising:
   a stow bracket operably supported from the frame;
   a rocker arm pivotally supported by said stow bracket about a pivot axis disposed between a proximal end and a distal end of said rocker arm;
   a liquid injector and a soil engaging tool supported by said rocker arm proximate said distal end of said rocker arm, said liquid injector and said soil engaging tool pivotally movable together with said rocker arm about said pivot axis between a lowered working position and a raised stowed position, whereby in said lowered working position said soil engaging tool is in engagement with the soil so as to form a trench in the soil and said liquid injector disposed to direct liquid fertilizer into the trench, and whereby in said raised stowed position said soil engaging tool and liquid injector are out of engagement with the soil;
   and
   a stowing mechanism comprising a stow lever engageable to selectively pivotally position said rocker arm together with said soil engaging tool and said liquid injector in said lowered working position and in said raised stowed position, wherein, in said raised stowed position, said soil engaging tool and said liquid injector are out of engagement with the soil while the plurality of row units of the planter are in said lowered planting position.

2. The retractable inductor of claim 1, wherein said soil engaging tool is a coulter.

3. The retractable inductor of claim 2, further comprising a gauge wheel rotatably supported adjacent said coulter.

4. The retractable inductor of claim 3, further including a depth adjuster to selectively adjustably position said gauge wheel with respect to said coulter to adjust penetration depth of the coulter into the soil.

5. The retractable inductor of claim 2, further comprising a scraper adjustably movable with respect to said coulter to remove soil buildup on said coulter.

6. The retractable inductor of claim 1, wherein said soil engaging tool is a shank.

7. The retractable inductor of claim 1, wherein said spring bias exerts a downforce on said soil engaging tool when said rocker arm is in said lowered working position.

8. The retractable inductor of claim 7, wherein said spring bias is adjustable.

9. The retractable inductor of claim 1, further comprising:
   a spring disposed to exert a downforce bias on said distal end of said rocker arm when said soil engaging tool is in said lowered working position.

10. The retractable inductor of claim 1 further comprising:
    a saddle bracket rigidly mounted to the frame, said saddle bracket pivotally supporting said stow bracket about said pivot axis.

11. The retractable inductor of claim 10 wherein said stow lever is an L-shaped rod having a leg pivotally attached to said saddle bracket, said leg having a plate secured thereto, said plate selectively engagable with notches in said stow bracket, whereby said selective engagement of said plate with said notches provides for said selective pivotal position of said rocker arm with respect to the frame between said lowered working position and said raised stowed position.

12. The retractable inductor of claim 11 further comprising:
    a swivel bolt pivotally coupled to said stow bracket;
    a rod having a first end operably pinned to said proximal end of said rocker arm, a length of said rod extending through said swivel bolt and said spring, a second end of said rod projecting through said spring threadably received by a nut, whereby said spring is restrained on said rod and compressible between said nut and said swivel bolt.

13. The retractable inductor of claim 12 whereby said downforce bias of said spring on said distal end of said rocker arm is adjustable by rotating said nut with respect to said rod.

* * * * *